United States Patent Office 3,379,875
Patented Apr. 23, 1968

3,379,875
STABILIZED POLYPHENYLENE OXIDE
COMPOSITION
Klaus E. Holoch, Pittsfield, Mass., assignor to General
Electric Company, a corporation of New York
No Drawing. Filed Feb. 21, 1966, Ser. No. 528,784
6 Claims. (Cl. 260—45.8)

ABSTRACT OF THE DISCLOSURE

A stabilized polyphenylene oxide composition consisting a polyphenylene oxide and a member selected from the group consisting of the benzoates of 2-mercaptobenzimidazole, 2-mercaptobenzoxazole, and 2-mercaptobenzothiazole.

This invention relates to stabilized polyphenylene oxide comprising a polyphenylene oxide and a member selected from a group consisting of the benzoates of 2-mercaptobenzimidazole, 2-mercaptobenzoxazole, 2-mercaptobenzothiazole.

The polyphenylene oxides are disclosed and claimed in U.S. Patents Ser. Nos. 3,306,874 and 3,306,875 of Allan S. Hay the contents of which are incorporated herein by reference. They are characterized by a unique combination of mechanical, chemical and electrical properties over a broad range of temperatures which render them suitable for a wide variety of commercial applications.

Though the polyphenylene oxides possess an outstanding combination of properties their use has been somewhat limited due to marginal aging stability. Heretofore, exposure of the polyphenylene oxides containing at least one aliphatic side chain to oxygen, particularly at elevated temperatures for sustained periods of time cause various reactions to occur within the polymer resulting in discoloration and embrittlement.

In French Patent No. 1,305,508 granted Mar. 18, 1963, 2-mercapto imidiazoles and 2-mercapto thiazoles are disclosed as stabilizers for linear thermoplastics. These materials were used in an attempt to stabilize the polyphenylene oxides and some improvement in stability was observed. However, it has now been unexpectedly found that far better stability can be obtained when the stabilizer is a member selected from the group consisting of benzoates of 2-mercapto imidiazole, 2-mercapto thiazole and 2-mercapto oxazole. It has also been discovered that these benzoates can be formed in situ in the polymer during processing if the mercapto compound is added to the polymer together with a second material capable of reacting therewith during processing to form the benzoate. By using the stabilizer system of this invention with a polyphenylene oxide, it is possible to formulate a polymeric composition having excellent stability to discoloration and embrittlement upon exposure to oxygen at both room and elevated temperatures.

The polyphenylene oxide, as used throughout this disclosure and in the claims is meant to include those polymers described and claimed in the above noted U.S. patent applications of Allan S. Hay wherein the phenylene nucleus contains at least one aliphatic side chain. The preferred class of polymers in accordance with the present invention are those formed from 2,6 disubstituted phenols and the most preferred polymers are those formed from 2,6 dialkyl phenols.

The benzoates of 2-mercaptobenzimidazole, 2-mercaptobenzothiazole, and 2-mercaptobenzoxazole within the scope of the present invention may be represented by the following general formula:

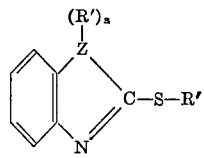

wherein $a$ is a whole number equal to 0 or 1; Z is a member selected from the group consisting of oxygen, sulfur and nitrogen; and R' is a member selected from the group consisting of hydrogen and a benzoyl radical of the following formula:

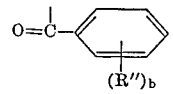

wherein R" is a member selected from the group consisting of hydrogen and an alkyl group having from 1 to 3 carbon atoms; and $b$ is a whole number equal to from 0 to the number of replaceable hydrogen atoms on the phenylene nucleus; provided that at least one of said R' be a benzoyl radical, and provided further that when Z is oxygen or sulfur, $a$ is 0.

For brevity, the expression "benzoate" will be used throughout the remainder of the disclosure to represent those compounds falling within the scope of Formula I above.

As noted above, the benzoate of the mercapto compound may be used or may be formed in situ by reaction of the mercapto compound with a material capable of forming the benzoate during processing of the polymer. The preferred material for in situ formation is benzoic anhydride. Other compounds include, but are not limited to methyl benzoate, ethyl benzoate, benzoic acid, etc.

There are various methods for forming the stabilized resins of this invention, though the particular method used does not constitute a part of this invention. One procedure involves blending where the stabilizer is added to the other ingredients of the formulation to produce a free flowing, powdery mixture called a dry blend or a powder blend. Generally, when the stabilizer is in liquid form, it is sprayed on the powdered resin which is stirred in a heated chamber. The stabilizer can be heated prior to spray mixing to reduce the time required to produce the dry blend. Cooling the batch is the final step in producing the dry blend from which it can be fed to an extruder, roll mill or internal type mixer such as the Banbury. Another method comprises the use of differential two speed roll mills and internal type mixers. These mixers apply heat and energy to the resin and stabilizer to achieve admixture of the two and produce a powder mass. This can then be fed to the finishing machine, such as a calender to obtain the desired product. A third procedure involves mixing a stabilizer in liquid form with the polymer in powder form. The result is a resin stabilizer suspension which can be stored and ultimately processed by a variety of methods. It can be rotationally cast or slush molded or applied to various substrates such as fabrics, metal and paper by knife coating or spraying. A fourth method for incorporating the stabilizer in the polyphenylene oxide involves solution techniques. Here the resins and stabilizers are both dissolved in a mutual solvent which is thereafter allowed to evaporate leaving an intimate dispersion of stabilizer in the polymer.

The quantity of the mercapto compound used in combination with the polyphenylene oxide in order to effect stabilization may vary between 0.1 and 5%, but best results are achieved when it constitutes from 2–3% of the total concentration and this constitutes a preferred embodiment of this invention. To form the benzoate of 2-mercapto benzimidazole, 2-mercapto benzo thiazole or 2-benzo in situ, approximately 0.1–2% of the respective 2-mercapto compound is added to the polymer along with from 3–4% of the material capable of reacting therewith to form the corresponding benzoate.

The polyphenylene oxides containing the stabilizers of this invention have excellent resistance to discoloration and embrittlement due to oxygen attack, even after aging at elevated temperatures, for sustained periods of time. For example, a film of a poly (2,6-dimethyl-1,4-phenylene)-oxide containing the benzoate of 2-mercapto benzimidazole dibenzoate has a fold number of 30 after aging 8 days at 150° C. The same polymer unstabilized and aged in the same manner had a fold number of less than 1. In addition, the stabilized sample possessed a very pale yellow coloration after aging while the unstabilized polymer appeared dark brown. This improvement in stability is particularly surprising as a 2-mercapto-benzimidazole when used with the same polyphenylene oxide aged 8 days at 150° C. had a fold number of only 8 and possessed a dark yellow coloration.

The following examples are set forth for purposes of illustration only and are not to be construed as limiting. All percentages expressed in the examples are by weight unless indicated otherwise.

aluminum foil using 10 mil shims. Molding temperature was maintained at approximately 550° F. and molding time was approximately 2 minutes. The resulting films ranged between 9 and 12 mils in thickness. The films were cut into samples having a width of 1 centimeter.

The effect of heat aging on brittleness of the molded films formed from both powder blends and pellets was determined by measuring the fold number. The fold number is determined by subjecting the film strip to a series of folding cycles which comprises in folding the film through 180° and pressing the two halves firmly together without creasing them. Thereafter, the film is folded in the opposite direction through 360° to complete 1½ cycles and then continuously refolded through 360° until a crease forms and ¾ of the width has been ruptured. The number of folding cycles required for this rupture is defined as the fold number. The results of the aging tests appear in Table I, below. Aging was conducted at 150° C. and 175° C. The letter E appearing in the example nos. indicates a film formed from extruded pellets. Generally, the samples formed from pellets possessed poorer properties as extrusion was carried out at a temperature exceeding 500° F. and this caused aging of the polymer. The numbers appearing in the columns represent fold numbers.

The following results were obtained:

TABLE I.—EFFECT OF HEAT AGING AT 150° C. AND 175° C. ON BRITTLENESS OF POLYPHENYLENE OXIDE

| Ex. No. | Composition (Additive and Percent) | Fold Number | | | | | | | | | | | | | | | | | | | |
|---|---|---|---|---|---|---|---|---|---|---|---|---|---|---|---|---|---|---|---|---|---|
| | | 150° C. (Days) | | | | | | | | | | 175° C. (Hours) | | | | | | | | | | |
| | | 0 | 7 | 8 | 9 | 10 | 11 | 12 | 15 | 20 | 22 | 30 | 24 | 48 | 58 | 74 | 96 | 120 | 144 | 165 | 192 | 210 | 241 |
| 1 | | 2 | 0 | | | | | | | 0 | | | 0 | 0 | 0 | | | | | 0 | | |
| 1E | | 0 | 0 | | | | | | | 0 | | 1 | 0 | 0 | 0 | | | | | 0 | | |
| 2 | 0.5% 2-mercapto benzimidazole | 3 | | | 0 | | | | | | | | 4 | | 1 | 3 | | | | | | |
| 2E | do | 6 | | | 0 | | | | | | | | 0 | | 0 | | | | | | | |
| 3 | 1.0% 2-mercapto benzimidazole | 7 | | | | | 2 | | | | | | | | | | | | | | | |
| 4 | 1.0% 2-mercapto benzothiazole | | 8 | 5 | | | | | 0 | | | | 4 | | 4 | | 0 | | | | | |
| 5 | 1% 2-mercapto benzothiazole | | 7 | 5 | | | | | | | | | 4 | | 4 | | 0 | 0 | 0 | 0 | | |
| 6 | 1% 2-mercapto benzimidazole dibenzoate | | | | | | 11 | | | | 0 | | | | 11 | 6 | | | | | | |
| 7 | 1% 2-mercapto benzothiazole benzoate | | | | | | | | 15 | | | 8 | | | | | | | | | | |
| 7E | do | | | | | | | | 10 | | | 5 | | | | | | | | | | |
| 8 | 1% 2-mercapto benzimidazole, 1% benzoic acid. | | | | | | | | 14 | | | | 0 | | | 8 | 5 | | | | 0 | |
| 9 | 1% 2-mercapto benzimidazole, 2% benzoic anhydride. | | | | | | | | 19 | | | | 0 | | | 10 | 6 | | | | 0 | |
| 10 | do | | | | | | | | 15 | | | | 0 | | | 9 | 5 | | | | 0 | |
| 11 | 2% 2-mercapto benzimidazole, 4% benzoic anhydride. | | | | | | | | | | | 30 | | | 8 | | | 15 | 15 | 8 | | 5 |
| 11E | do | | | | | | | | | | | | | | | | | 8 | | | 2 | |
| 12 | 2% 2-mercapto benzimidazole dibenzoate | | | | | | | | | 17 | | | 0 | | | 8 | 5 | | | | 0 | |
| 13 | 2% 2-mercapto benzimidazole dibenzoate, 2% benzoic anhydride, 2% 2-mercapto benzimidazole. | | | | | | | | | | | 27 | | 7 | | 14 | 12 | 10 | | | 4 | |
| 13E | 2% 2-mercapto benzimidazole dibenzoate, 2% benzoic anhydride. | | | | | | | | | | | | | | | | | 6 | | | 3 | |
| 14 | 2% 2-mercapto benzimidazole, 2% benzoic anhydride, 1% benzoic acid. | | | | | | | | | | | 30 | | 2 | | 10 | 10 | | | | 2 | |
| 15 | 2% 2-mercapto oxazole benzoate | | | | | | | | 15 | | | | 4 | | 0 | | | | | | | |

From the above, it is apparent that addition of stabilizer substantially increases the fold number. A comparison of Examples 1–5 with the remaining examples illustrates the improvement that may be obtained using the stabilizer system of the present invention over the prior art stabilizers.

*Examples 16–26*

The films formed from the powder blends and pellets of the above examples were used to determine the effect of aging at temperatures of 150° C. and 175° C. on color of the polymer. Samples of films pressed from powder and pellet were periodically examined after prolonged exposure to high temperatures in the presence of oxygen and a visual determination of color observed. The results are set forth in Table II below. For brevity, the following symbols were used to represent the color of the film:

*Examples 1–5*

Stabilized samples were prepared from a poly-(2,6-dimethyl-1,4-phenylene)-oxide having an intrinsic viscosity of approximately 0.50 deciliters per gram (dl./g.) as measured in chloroform at 30° C. In all cases, samples were prepared by mixing 250 grams of the polyphenylene oxide in powder form with the appropriate quantity of stabilizer in a blender to form a dry blend. After blending for a period of 1–2 minutes, a portion of the dry blend was passed through an extruder and the extruded strand was chopped into pellets. Thereafter, films were molded from both the powder blend and the pellets. The films were formed by placing the polymer between C—colorless or very pale yellow
L—Light
D—Dark
G—Green
Y—Yellow
Br—Brown
Bl—Black TABLE II.—EFFECT OF HEAT AGING ON COLOR OF POLYPHENYLENE OXIDE AT 150° C. AND 175° C.

| Ex. No. | Composition (Additive and Percent) | 150° C. (days) | | | | | | | | | 175° C. (hours) | | | | |
|---|---|---|---|---|---|---|---|---|---|---|---|---|---|---|---|
| | | 0 | 5 | 7 | 8 | 9 | 15 | 20 | 22 | 30 | 24 | 54 | 77 | 121 | 241 |
| 16 | | Y | Y | DY | Br | | Br | DBr | | | DY | Br | Br | Br | Bl |
| 16E | | LBr | LBr | LBr | | | DBr | Bl | | | DY | Br | | | |
| 17 | 1% 2-mercapto benzo-oxazole | | | DY | Br | | | | | | | | Br | Br | Bl |
| 18 | 1% 2-mercapto benzothiazole | | | DY | Br | | | | | | | | Br | Br | Bl |
| 19 | 1% 2-mercapto benzimidazole dibenzoate | Y | | | Dy | | | Br | | | | | Br | | |
| 20 | 1% 2-mercapto benzimidazole, 1% benzoic acid | LY | | | Dy | Dy | | Br | | | | | Br | | |
| 21 | 1% 2-mercapto benzimidazole, 2% benzoic acid | LY | | | Y | Br | | Br | DBr | | | | DY | | |
| 22 | 1% 2-mercapto benzimidazole, 2% benzoic anhydride | | | | Y | | | Br | | | | | DY | | |
| 23 | 1% 2-mercapto benzimidazole, 4% benzoic anhydride | | | | | LY | LY | | Y | Br | | | | | |
| 23E | do | LY | | LY | | LY | LY | | DY | Br | | | | | |
| 24 | 2% 2-mercapto benzimidazole, 2% benzoic anhydride | | | | C | | | LY | | | | | LY | | |
| 24E | do | Y | | | | | | | | | | | | | |
| 25 | 2% 2-mercapto benzimidazole, 1% benzoic acid, 1% benzoic anhydride | | | | C | | | DY | | | | | LY | | |
| 25E | do | G | | | | | | | | | | | | | |
| 26 | 2% 2-mercapto benzimidazole, 2% 2-mercapto benzimidazole, dibenzoate 2% benzoic anhydride | | | | C | | | LY | | | | | Br | | |

*Example 27*

Following the procedures of the aboxe examples, a sample was prepared from a poly-(2-methyl-6-phenyl-1,4-phenylene) oxide having an intrinsic viscosity of 0.98 dl./g. as measured in chloroform at 30° C. The sample contained 2% 2-mercapto benzimidazole dibenzoate. The sample was aged in air for 120 hours at 175° C. It has a yellow coloration. A sample of the same polymer without stabilizer was dark brown after the same aging procedure. The stabilized sample had a fold number of ¼ while the standard was too brittle to measure.

It should, of course, be apparent to those skilled in the art that changes may be made in the particular emmodiments of the invention described which are within the full intended scope of the invention as defined by the appended claims.

What I claim as new and desire to secure by Letters Patent of the United States is:

1. An oxidation resistant polyphenylene oxide having at least one aliphatic side chain attached to a phenylene nucleus stabilized with from 0.1 to 5.0% by weight of a compound having the formula

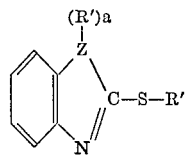

where $a$ is a whole number equal to 0 or 1; Z is a member selected from the group consisting of oxygen, nitrogen and sulfur; R' is a member selected from the group consisting of hydrogen and a benzoyl radical of the formula

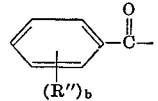

where R" is a member selected from the group consisting of hydrogen and an alkyl group having from 1–3 carbon atoms and $b$ is a whole number equal to from 0 to the number of replaceable hydrogen atoms on the phenylene nucleus; provided that at least one of said R's be a benzoyl radical and provided further that when Z is sulfur or oxygen, $a$ is 0.

2. The composition of claim 1 wherein the stabilizer comprises from 2 to 3% by weight of the total composition.

3. The composition of claim 2 wherein the polyphenylene oxide is poly-(2,6-dimethyl-1,4-phenylene) oxide.

4. The composition of claim 3 wherein the stabilizer is the dibenzoate of 2-mercaptobenzimidazole.

5. The composition of claim 3 wherein the stabilizer is the benzoate of 2-mercaptobenzothiazole.

6. The composition of claim 3 wherein the stabilizer is the benzoate of 2-mercaptobenzoxazole.

References Cited

UNITED STATES PATENTS 3,308,091   3/1967   Zapp _____ 260—45.8
3,309,337   3/1967   Hurlock et al. _____ 260—45.8

DONALD E. CZAJA, *Primary Examiner.*

M. J. WELSH, *Assistant Examiner.*